(12) United States Patent
Schütte et al.

(10) Patent No.: US 8,192,202 B2
(45) Date of Patent: Jun. 5, 2012

(54) FIRE TRAINING SYSTEM

(75) Inventors: Volker Schütte, Lübeck (DE); Martin Reichel, Offendorf (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 1586 days.

(21) Appl. No.: 11/272,565

(22) Filed: Nov. 10, 2005

(65) Prior Publication Data

US 2006/0141429 A1    Jun. 29, 2006

(30) Foreign Application Priority Data

Dec. 2, 2004   (DE) .......................... 10 2004 058 190

(51) Int. Cl.
  *G09B 19/00* (2006.01)
(52) U.S. Cl. .......................................... 434/226; 73/866
(58) Field of Classification Search .................. 434/226; 73/866

See application file for complete search history.

(56) References Cited

U.S. PATENT DOCUMENTS

| | | | | |
|---|---|---|---|---|
| 4,008,038 A | * | 2/1977 | Berthiaume | 431/11 |
| 4,303,396 A | * | 12/1981 | Swiatosz | 434/226 |
| 4,861,270 A | * | 8/1989 | Ernst et al. | 434/226 |
| 4,983,124 A | * | 1/1991 | Ernst et al. | 434/226 |
| 5,052,933 A | | 10/1991 | Rogers et al. | |
| 5,055,050 A | * | 10/1991 | Rogers et al. | 434/226 |
| 5,226,818 A | * | 7/1993 | Feiock et al. | 434/226 |
| 5,233,869 A | * | 8/1993 | Rogers et al. | 73/294 |
| 5,266,033 A | * | 11/1993 | Rogers et al. | 434/226 |
| 5,316,484 A | | 5/1994 | Layton et al. | |
| 5,320,536 A | * | 6/1994 | Rogers et al. | 434/226 |
| 5,328,375 A | * | 7/1994 | Rogers et al. | 434/226 |
| 5,335,559 A | * | 8/1994 | Rogers et al. | 73/866 |
| 5,345,830 A | * | 9/1994 | Rogers et al. | 73/866 |
| 5,374,191 A | * | 12/1994 | Herman et al. | 434/226 |
| 5,411,397 A | * | 5/1995 | Rogers et al. | 434/226 |
| 5,447,437 A | * | 9/1995 | Joynt et al. | 434/226 |
| 5,518,402 A | * | 5/1996 | Tommarello et al. | 434/226 |
| 5,518,403 A | * | 5/1996 | Luftig et al. | 434/226 |
| 5,688,136 A | * | 11/1997 | Rogers et al. | 434/226 |
| 6,802,718 B2 | * | 10/2004 | Musto et al. | 434/226 |
| 6,866,513 B2 | * | 3/2005 | Hough | 434/226 |
| 2003/0124496 A1 | | 7/2003 | Hough | |
| 2003/0175662 A1 | | 9/2003 | Hough | |
| 2004/0256497 A1 | * | 12/2004 | Sharkey | 239/569 |

FOREIGN PATENT DOCUMENTS

EP        0 535 279        4/1993

* cited by examiner

*Primary Examiner* — Xuan Thai
*Assistant Examiner* — Alvin Carlos
(74) *Attorney, Agent, or Firm* — McGlew and Tuttle, P.C.

(57) ABSTRACT

A fire training system with improved ability to be handled and with the possibility of generating different flame aspects is provided. The fire training system has at least one liquid reservoir (1) and a regulating and control unit (2). The regulating and control unit (2) is connected to at least one distributor unit (5) via at least one electric line (3). The liquid gas reservoir (1) is connected to the at least one distributor unit (5) via at least one liquid gas line. (4). Each distribution unit (5) is provided with control valves that can be actuated for dispensing the liquid to downstream liquid gas discharge nozzles (6) and to an associated pilot burner (7), and with at least one sensor (8) for detecting the success of extinguishing. The liquid gas discharge nozzles (6) are arranged at a fire-resistant surface (9).

20 Claims, 2 Drawing Sheets

FIRE TRAINING SYSTEM

CROSS REFERENCE TO RELATED APPLICATIONS

This application claims the benefit of priority under 35 U.S.C. §119 of German Application DE 10 2004 058 190.8 filed Feb. 12, 2004, the entire contents of which are incorporated herein by reference.

FIELD OF THE INVENTION

The present invention pertains to a fire training system.

BACKGROUND OF THE INVENTION

A prior-art fire training system is known from EP 0 535 279 B1, in which fuel jets are generated by distributor tubes with holes in a dispersing medium such as water or pebbles to improve the flammability of the liquid fuel introduced into the unit according to U.S. Pat. No. 4,861,270. An essential drawback of this prior-art unit arises from the effort needed to install the distributor tubes in the dispersing medium as well as from the limited possibilities of specifically changing the flame aspects generated by the distributor tubes installed in the medium.

SUMMARY OF THE INVENTION

Consequently, the object of the present invention is to provide a fire training system with improved handling, so that it is also possible to generate different flame aspects.

According to the invention, a fire training system is provided with at least one liquid gas reservoir and a regulating and control unit. The regulating and control unit is connected to at least one distributor unit via at least one electric line and the liquid gas reservoir is connected to at least one distributor unit via at least one liquid gas line. Each distributor unit is provided with control valves that can be actuated for dispensing liquid gas to downstream liquid gas discharge nozzles and to an associated pilot burner and with at least one sensor for detecting the success of the extinguishing. The liquid gas discharge nozzles are arranged at a fire-resistant surface.

One or more temperature sensors may be present as the sensor for detecting the success of extinguishing.

Advantageously a plurality of fire training systems may be combined into an overall unit extended in a pattern such as a square or circular pattern with a central liquid gas reservoir as well as with a central regulating and control unit.

The liquid gas discharge nozzles may each be designed as a fan jet, solid-cone or hollow-cone nozzles.

One or more outflow channels with a water outflow may advantageously be present in the fire-resistant surface.

The control valves may be equal-percentage control valves that can be set electrically or pneumatically. This liquid gas is also known as LPG (Liquefied Petroleum Gas) or liquefied fuel gas, or liquefied gas fuel. Propane may be used as the gas. The liquid gas discharge nozzles may be designed as replaceable nozzles. The liquid gas discharge nozzles may be arranged above the fire-resistant surface. The discharge nozzles may be designed such that they can be recessed in the fire-resistant surface. The distributor and supply system, having electric lines, liquid gas lines and distributor units may be arranged under the fire-resistant surface. The distributor and supply system, having the electric lines, the liquid gas lines and the distributor units may be located in a pebble, sand, stone or earth bed.

The fire-resistant surface may consist of a stone pavement, especially furnace bricks. The fire-resistant surface may also consist of pebbles, sand, earth, clay or loam, the surface being able to be glazed by heat treatment or being fired. The fire-resistant surface may consist of a metal grid, which is protected against the heat of the flame by taking up water in an associated water basin. The fire-resistant surface may be the surface of a fire decoy, which said surface may have any desired shape.

An essential advantage of the fire training system according to the invention is obtained in reference to the simple installation and variability of the flame aspects formed due to the liquid gas discharge nozzles used and the fact that the liquid discharge nozzles are arranged at a fire-resistant surface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
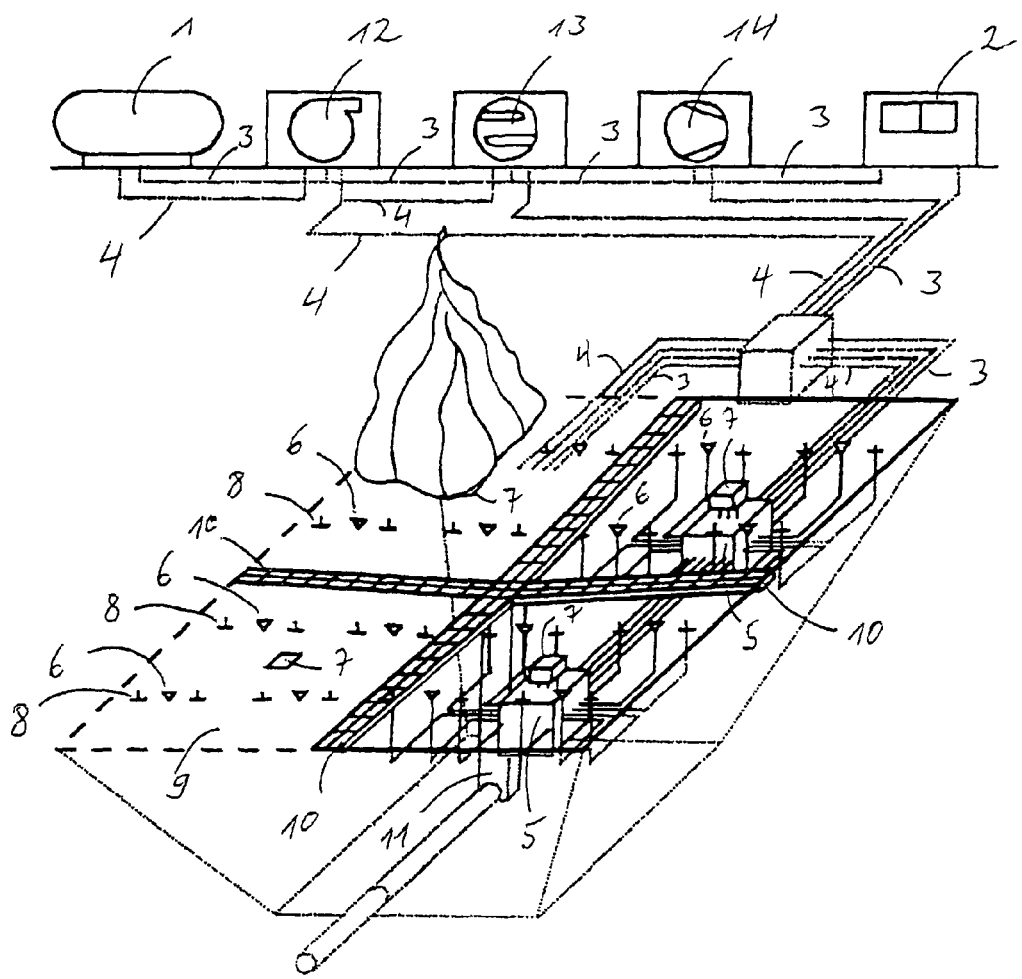
FIG. 1 is a view of a fire training system shown schematically.

Referring to the drawings in particular, the fire training system in FIG. 1 has one or more liquid or liquefied gas fuel reservoirs 1 for supplying the unit with a liquid, or liquefied gas, fuel such as propane, which is delivered into the unit especially by means of a pump 12. A central regulating and control unit 2 receives the measured signals of sensors 8 for detecting the success of extinguishing, for example, temperature sensors, as well as adjusting signals of the different adjusting elements and controls the unit. Each fire training system has at least one distributor unit 5 with control valves that can be actuated electrically or pneumatically for dispensing the liquid gas to liquid or liquefied gas fuel discharge nozzles 6 arranged downstream, which are designed as solid-cone, hollow-cone or fan jet nozzles and are located at or above a fire-resistant surface 9 that covers each distributor unit 5 with its feed and drain lines.

Each distributor unit 5 also supplies a pilot burner 7 with gaseous liquefied gas fuel, so that an igniting flame is already available in the standby operation before the activation of the individual liquid gas discharge nozzles 6. One or more outflow channels 10 with a water outflow 11 for receiving extinguishing liquid and surface water are present in the fire-resistant surface 9.

An essential advantage arises from the use of the liquid discharge nozzles 6, which are designed as fanjet, solid-cone or hollow-cone nozzles and which are, moreover, arranged above ground. Due to the selection corresponding to the essential characteristics such as spray angles, spray widths and particle sizes, it is possible to simulate the different flame aspects, and completely new possibilities arise for varying fire training systems. For example, fan jet nozzles with a spray angle of 360° or hollow-jet nozzles of the rebounding plate design make it possible, for example, to generate a flame structure with a circular base of 9 to about 16 square meters without problems. Fan jet nozzles with any desired spray angle, e.g., 90°, 120°, 180°, make it possible to deflect flame aspects in a preferred direction. It is thus possible to simulate a firewall with a single fan jet nozzle with 180° spray angle. In addition, special flame aspects can be generated by the use of the special types of nozzles; for example, a flame aspect extending essentially in one direction only can be generated with a solid-cone nozzle. The degree of combustion can be affected with hollow-cone nozzles used singly in order to change the percentage of soot at a desired point if this is desirable for the fire simulation.

A bulky medium is no longer needed for dispersing the fuel for so-called spill fire simulations in case of the use of solid-cone, hollow-cone or fan jet nozzles as liquid gas discharge nozzles. It is sufficient to install the distributor system in a sand or pebble bed with a wastewater system that can be designed freely for surface water and groundwater runoff, for example, through outflow channels 10 with a central water outflow 11. The sand or pebbles become vitreous after solidification and firing and can be walked on, vehicles can travel on them without limitations, or they are paved with pavement blocks, especially furnace bricks, and they thus form the fire-resistant surface 9.

Gaseous fuel is sent for the pilot burner 7 from the liquid gas fuel reservoir 1 or the necessary combustion gas and air are sent to the distributor unit or distributor units 5 underground by means of a pump 12 via an evaporator 13 and via a compressor 14 and from there to the pilot burner 7. The shut-off and control fittings for the liquid and gaseous fuel and the compressed air for possible pneumatic valves as well as the inputs of the sensors 8 arranged around them, which are designed especially as temperature sensors for detecting the success of extinguishing, are located in the distributor units 5. All the electric cables for controlling the system via the regulating and control unit 2 are also connected and passed through there. The fire-resistant surface 9 above the distributor units 5 ensures the necessary insulation against the thermal effect of the flames.

Figure 2:
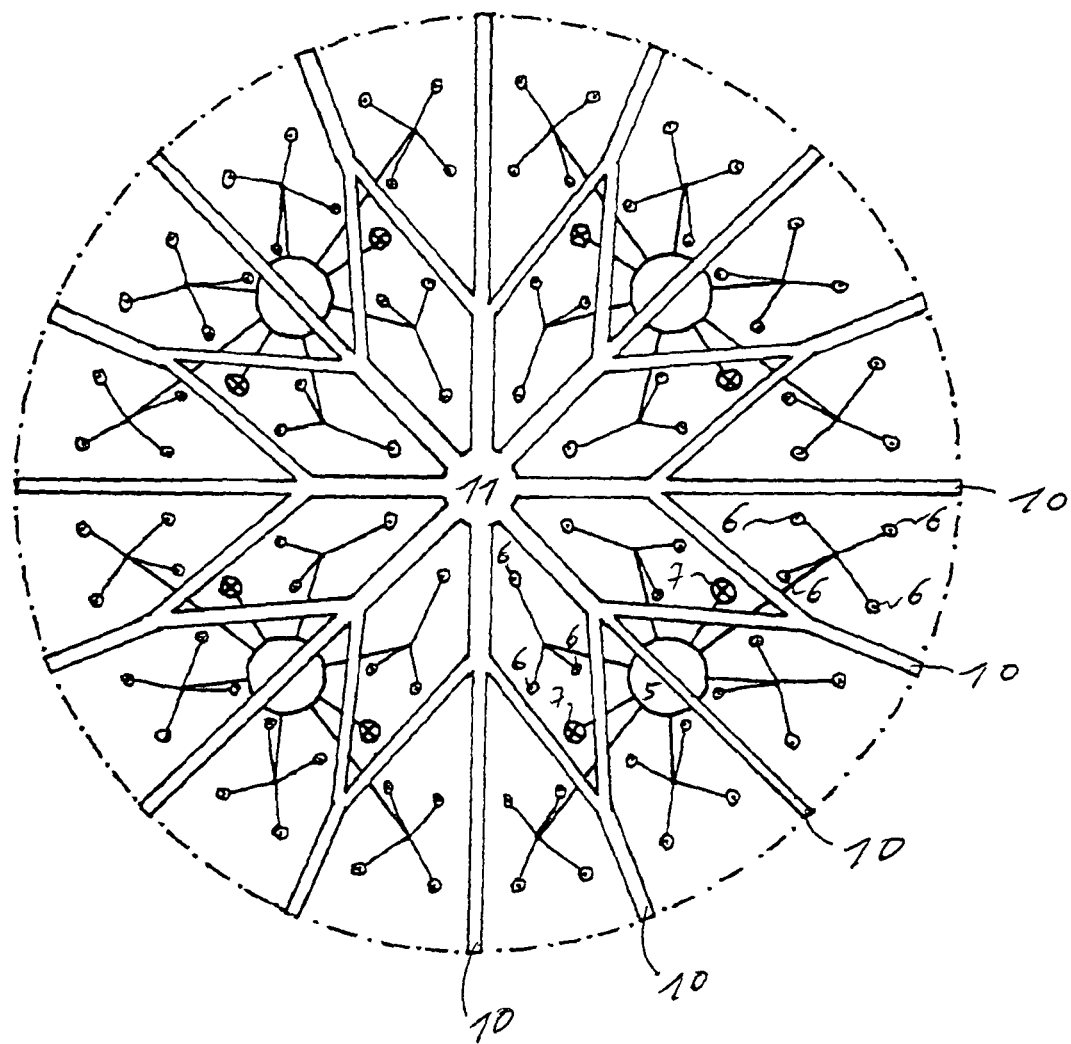
FIG. 2 is the top view of a circularly extended arrangement of a fire training system.

FIG. 2 shows the top view of a circularly extended arrangement of a fire training system for generating a circular spill fire of about 200 square meters with 24 controllable segments of about 8 square meters each. The outer segments are equipped with four liquid gas discharge nozzles 6 and the inner segments with three liquid gas discharge nozzles 6 each. The control valves in the distributor units 5 are preferably equal-percentage control valves, which can be set electrically or pneumatically and which are arranged at the shortest distance possible from the particular associated liquid gas discharge nozzle 6. This has the advantage that small quantities of residual gas are present as a result until the simulation flame is extinguished. On the other hand, control valves at these positions in the overall pipe system from the pump 12 or the liquid reservoir 1 to the liquid gas discharge nozzles 6 have a very low priority, i.e., their pressure drop is very low compared to the overall pressure drop. In case of usual linear control valves, this leads, on the one hand, to a very rapid increase in flow on opening and, on the other hand, to a very slow decrease of flow and consequently of the flame height during closing. By contrast, equal-percentage valves open slowly and close rapidly and are preferably used here. Thus, little liquid gas will flow at first at the start, and this liquid gas will partially or completely evaporate in the tube already before the outlet of the nozzle and can thus be ignited with the usual pilot burners 7. The rapid closing means that the flames respond to the control immediately, as a result of which the success of extinguishing and re-ignition can be simulated substantially more realistically. The liquid gas discharge nozzles 6, the pilot burners 7 and the temperature sensors can be designed such that they can be or are recessed and can be transferred, so that the entire area of the fire training system remains able to be walked and traveled on during and after the extinguishing mission.

While specific embodiments of the invention have been shown and described in detail to illustrate the application of the principles of the invention, it will be understood that the invention may be embodied otherwise without departing from such principles.

What is claimed is:

1. A fire training system comprising:
a liquefied gas fuel reservoir;
a distributor unit;
an electric line;
a liquid gas line, said liquefied gas fuel reservoir being connected to said distributor unit via said liquid gas line;
downstream liquefied gas fuel discharge nozzles and an associated pilot burner, said liquefied gas fuel discharge nozzles being designed as fan jet nozzles, solid-cone nozzles or hollow-cone nozzles;
a fire-resistant surface;
a sensor for detecting success of extinguishing of a flame; and
a regulating and control unit connected to said distributor unit via said electric line, said distributor unit being provided with control valves that can be actuated for dispensing liquefied gas fuel to said downstream liquefied gas fuel discharge nozzles and to said associated pilot burner, said regulating and control unit being connected to said sensor, said liquefied gas fuel discharge nozzles being arranged at said fire-resistant surface.

2. A fire training system in accordance with claim 1, wherein one or more temperature sensors are provided as said sensor for detecting the success of extinguishing.

3. A fire training system in accordance with claim 1, wherein a plurality of fire training systems are combined into an overall unit extended in a square or circular pattern with said liquefied gas fuel reservoir provided as a central liquefied gas fuel reservoir as well as with said regulating and control unit provided as a central regulating and control unit.

4. A fire training system in accordance with claim 1, further comprising an outflow channel with a water outflow provided in said fire-resistant surface.

5. A fire training system in accordance with claim 1, wherein said control valves are equal-percentage control valves that can be set electrically or pneumatically.

6. A fire training system in accordance with claim 1, wherein said liquefied gas fuel reservoir contains propane for use as the liquefied gas fuel.

7. A fire training system in accordance with claim 1, wherein said liquefied gas fuel discharge nozzles are designed as replaceable nozzles.

8. A fire training system in accordance with claim 1, wherein said liquefied gas fuel discharge nozzles are arranged above said fire-resistant surface.

9. A fire training system in accordance with claim 1, wherein said liquefied gas fuel discharge nozzles are designed such that they are recessed in said fire-resistant surface.

10. A fire training system in accordance with claim 1, further comprising a distributor and supply system with electric lines including said electrical line, liquid gas lines including said liquid gas line and distributor units including said distributor unit, said distributor and supply system being arranged under said fire-resistant surface;

said liquefied gas fuel discharge nozzles being arranged above said fire-resistant surface.

11. A fire training system in accordance with claim 1, further comprising a distributor and supply system with electric lines including said electrical line, liquid gas lines including said liquid gas line and distributor units including said distributor unit, said distributor and supply system being located in a pebble, sand, stone or earth bed.

12. A fire training system in accordance with claim 1, wherein said fire-resistant surface consists essentially of one or more of a stone, stone pavement, pavement and furnace bricks.

13. A fire training system in accordance with claim 1, wherein said fire-resistant surface consists essentially of one or more of pebbles, sand, earth, clay or loam, wherein said surface may be glazed by heat treatment or by being fired.

14. A fire training system in accordance with claim 1, wherein said fire-resistant surface comprises a metal grid, which is protected against heat of said flame by taking up water in an associated water basin.

15. A fire training system in accordance with claim 1, wherein said fire-resistant surface comprises a surface of a fire decoy, said surface having a desired shape to provide said fire decoy.

16. A fire training system, comprising:
a fire-resistant floor surface;
a plurality of liquefied gas fuel nozzles arranged at said fire-resistant surface and for discharging liquefied gas fuel, said nozzles discharging the liquefied gas fuel for combustion above the fire-resistant floor surface;
a distributor and supply system with a plurality of electric lines, a plurality of liquefied gas fuel lines connected to said nozzles and a plurality of distributor units, said distributor and supply system being arranged under said fire-resistant floor surface;
a liquefied gas fuel reservoir connected to said liquefied gas fuel lines;
a sensor arranged at said fire-resistant floor surface for detecting success of extinguishing of a flame; and
a regulating and control unit connected to said distributor units via said electric lines, each of said distributor units being provided with control valves that can be actuated for dispensing liquefied gas fuel to said nozzles;
an outflow channel with a water outflow provided in said fire-resistant floor surface and wherein said nozzles are designed as fan jet nozzles, solid-cone nozzles or hollow-cone nozzles arranged above said fire-resistant floor surface or recessed in said fire-resistant surface.

17. A fire training system comprising:
a liquefied gas fuel reservoir;
a distributor unit;
an electric line;
a liquid gas line, said liquefied gas fuel reservoir being connected to said distributor unit via said liquid gas line;
downstream liquefied gas fuel discharge nozzles and an associated pilot burner, said liquefied gas fuel discharge nozzles being designed as replaceable nozzles;
a fire-resistant surface;
a sensor for detecting success of extinguishing of a flame; and
a regulating and control unit connected to said distributor unit via said electric line, said distributor unit being provided with control valves that can be actuated for dispensing liquefied gas fuel to said downstream liquefied gas fuel discharge nozzles and to said associated pilot burner, said regulating and control unit being connected to said sensor, said liquefied gas fuel discharge nozzles being arranged at said fire-resistant surface.

18. A fire training system comprising:
a liquefied gas fuel reservoir;
a distributor unit;
an electric line;
a liquid gas line, said liquefied gas fuel reservoir being connected to said distributor unit via said liquid gas line;
downstream liquefied gas fuel discharge nozzles and an associated pilot burner;
a fire-resistant surface;
a sensor for detecting success of extinguishing of a flame; and
a regulating and control unit connected to said distributor unit via said electric line, said distributor unit being provided with control valves that can be actuated for dispensing liquefied gas fuel to said downstream liquefied gas fuel discharge nozzles and to said associated pilot burner, said regulating and control unit being connected to said sensor, said liquefied gas fuel discharge nozzles being arranged at said fire-resistant surface;
a distributor and supply system with electric lines including said electrical line, liquid gas lines including said liquid gas line and distributor units including said distributor unit, said distributor and supply system being located in a pebble, sand, stone or earth bed.

19. A fire training system comprising:
a liquefied gas fuel reservoir;
a distributor unit;
an electric line;
a liquid gas line, said liquefied gas fuel reservoir being connected to said distributor unit via said liquid gas line;
downstream liquefied gas fuel discharge nozzles and an associated pilot burner;
a fire-resistant surface comprising a metal grid, which is protected against heat of said flame by taking up water in an associated water basin;
a sensor for detecting success of extinguishing of a flame; and
a regulating and control unit connected to said distributor unit via said electric line, said distributor unit being provided with control valves that can be actuated for dispensing liquefied gas fuel to said downstream liquefied gas fuel discharge nozzles and to said associated pilot burner, said regulating and control unit being connected to said sensor, said liquefied gas fuel discharge nozzles being arranged at said fire-resistant surface.

20. A fire training system in accordance with claim 16, wherein said fire-resistant floor surface comprises one or more of a stone, stone pavement, pavement and furnace bricks, pebbles, sand, earth, clay, loam, a surface glazed by heat treatment or a surface glazed by being fired, a metal plate with openings and a metal grid.

* * * * *